Figure 6:
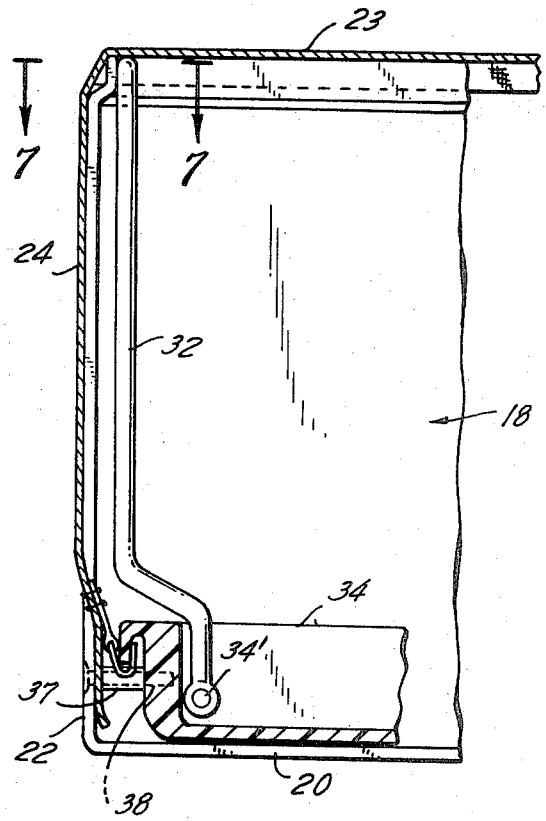

United States Patent [19]
Fulton et al.

[11] 3,785,693
[45] Jan. 15, 1974

[54] PORTABLE SLEEPING COMPARTMENT

[75] Inventors: James F. Fulton, Mamaroneck, N.Y.; Joseph A. Rinaldi, Oradell, N.J.

[73] Assignee: Fulton & Partners, Inc., New York, N.Y.

[22] Filed: Apr. 25, 1972

[21] Appl. No.: 247,428

[52] U.S. Cl.................. 296/23 R, 296/27, 135/1 A
[51] Int. Cl................................................ B60p 3/32
[58] Field of Search.................. 296/23 R, 23 MC, 296/26, 27; 135/1 A, 1 R

[56] References Cited
UNITED STATES PATENTS

| | | | |
|---|---|---|---|
| 2,863,178 | 12/1958 | Hagen | 135/1 A |
| 1,984,681 | 12/1934 | Jackson | 296/23 R |
| 2,066,342 | 1/1937 | Gorton | 296/23 R |
| 3,186,419 | 6/1965 | McCarroll | 13.5/1 A |
| 2,561,168 | 7/1951 | Beckley | 296/23 R |

FOREIGN PATENTS OR APPLICATIONS

| | | | |
|---|---|---|---|
| 682,860 | 11/1952 | Great Britain | 296/23 R |

Primary Examiner—Kenneth H. Betts
Assistant Examiner—John A. Carroll

[57] ABSTRACT

A portable sleeping compartment is foldable into an open and closed position and forms a compact weatherproof container. In one embodiment the compartment is removably mounted on the top of a car, and in another larger embodiment the compartment is mounted on a trailer and towed behind the car. The compartment advantageously has front and rear panels readily pivoted about a hinge on a floor panel. The three panels have a highly desirable shell configuration to enhance the formation of the enclosure.

A flexible weatherproof cover is secured at the top of both the front and rear panels and conveniently folds into place when the front and rear panels are moved to the upright or open position.

4 Claims, 19 Drawing Figures

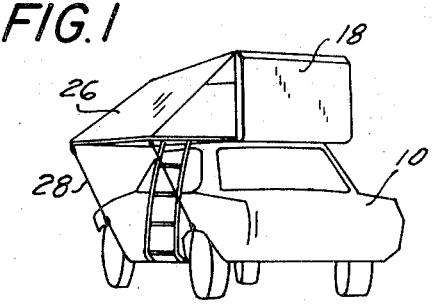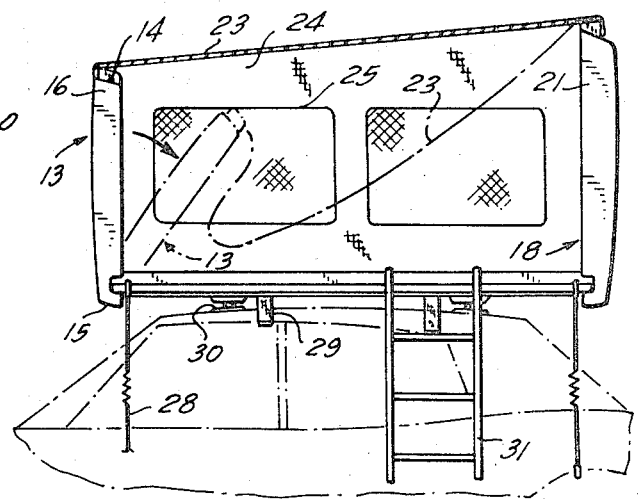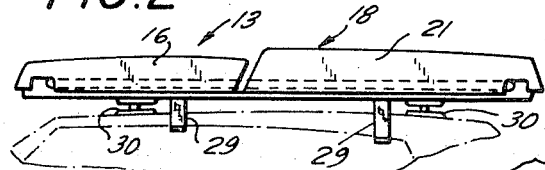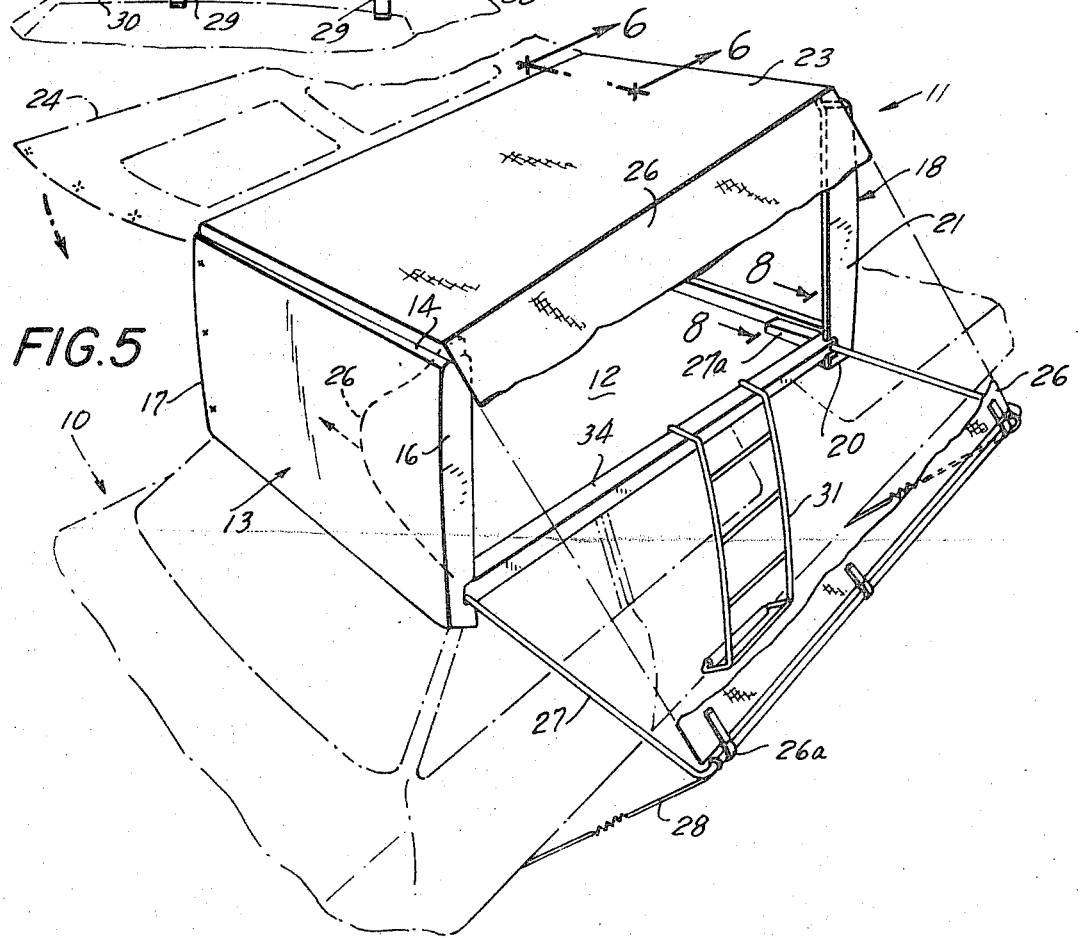

PATENTED JAN 15 1974 3,785,693
SHEET 2 OF 6
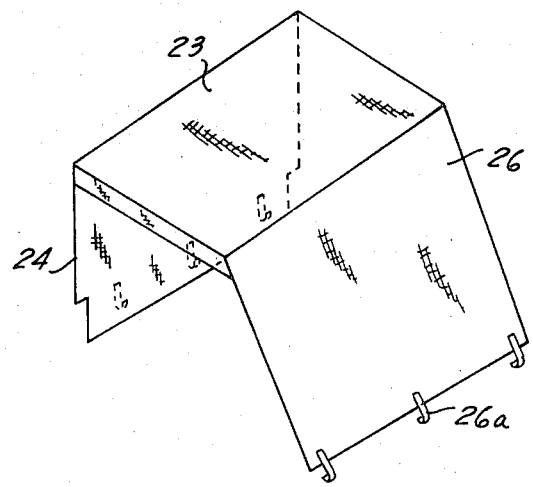
FIG.3
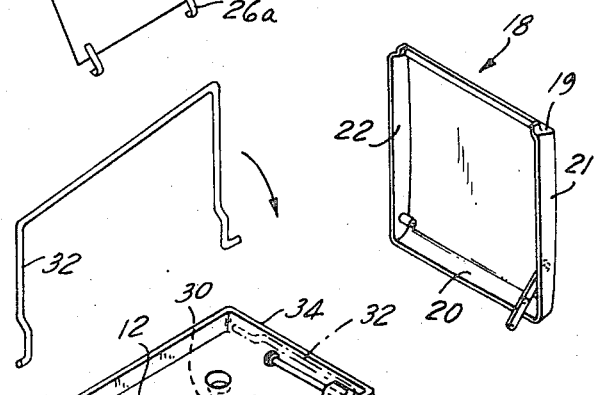
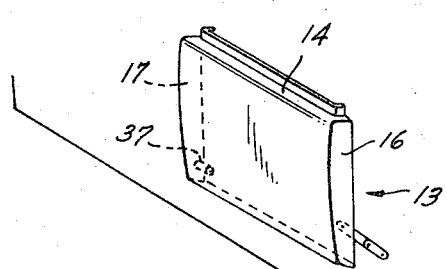
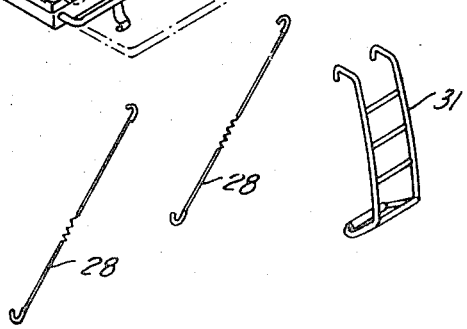
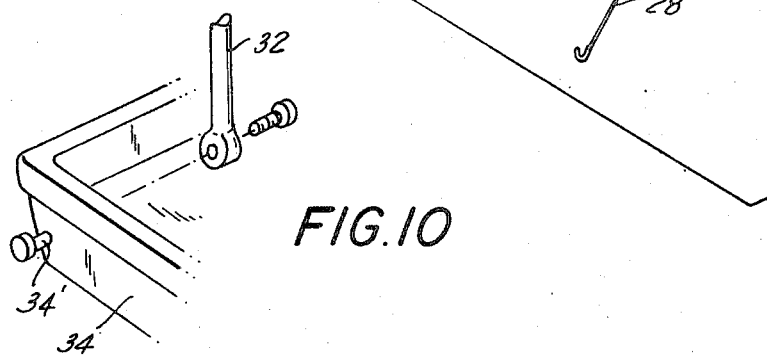
FIG.10

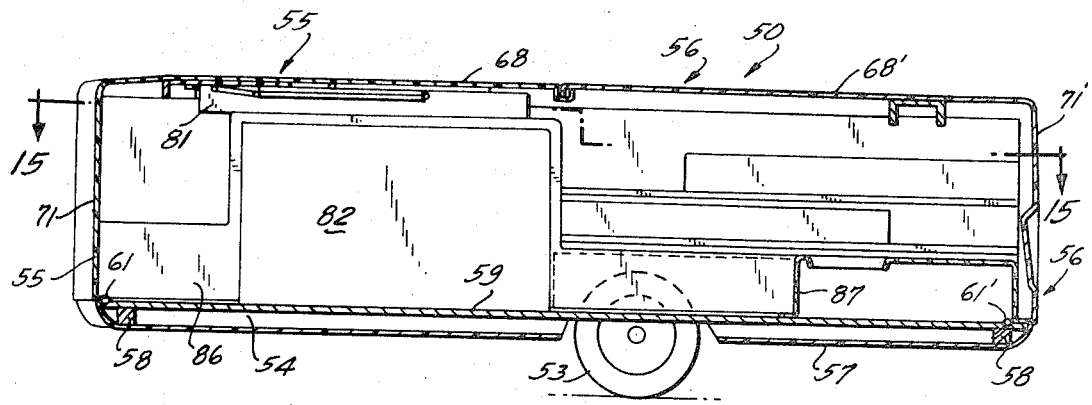
FIG. 14
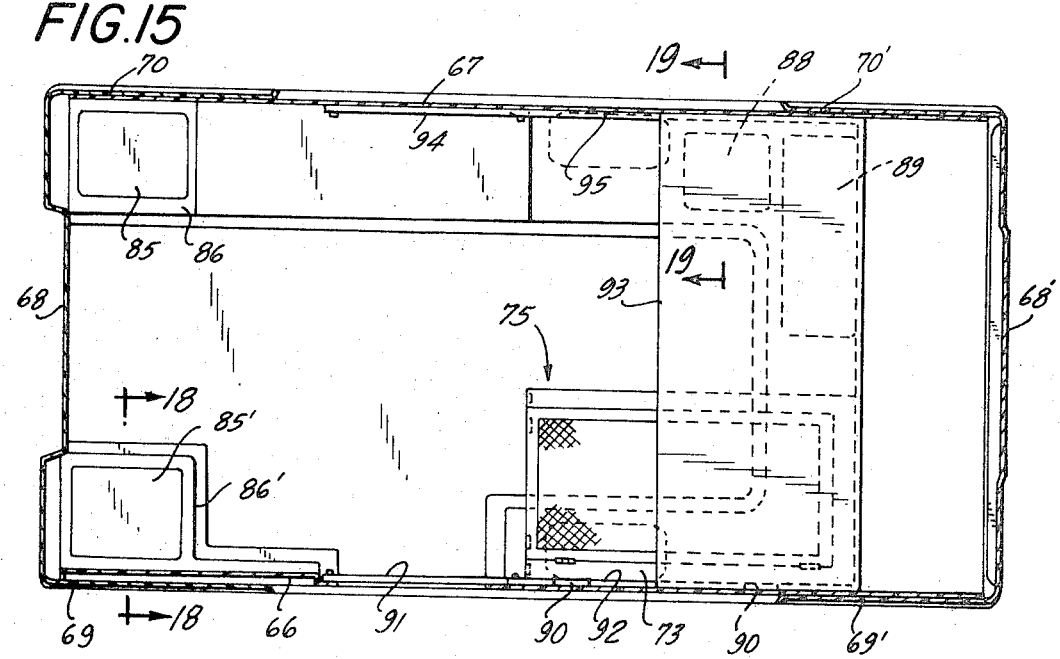
FIG. 15
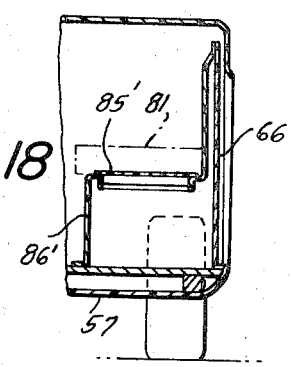
FIG. 18
FIG. 19

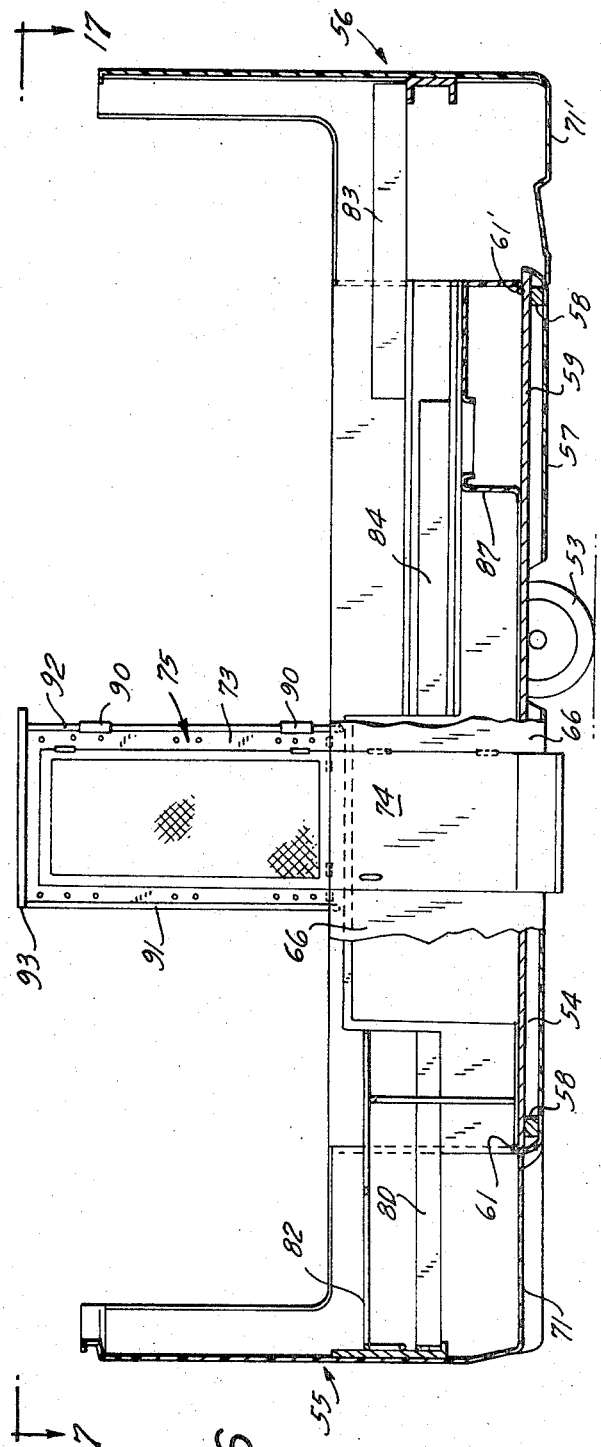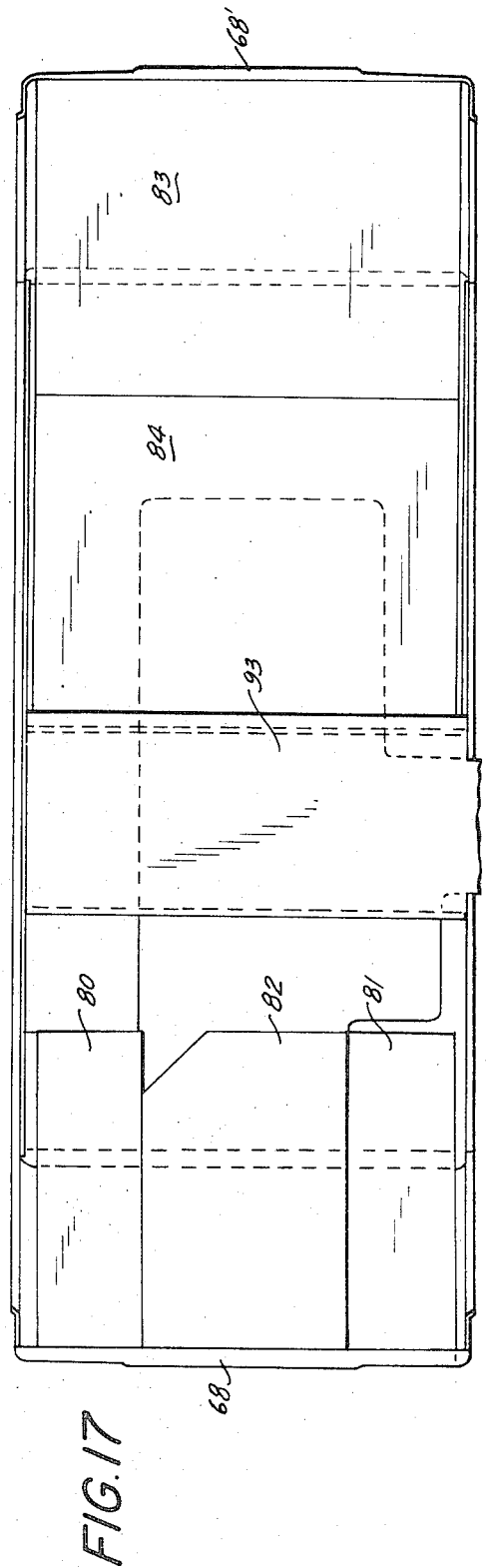

PORTABLE SLEEPING COMPARTMENT

BACKGROUND OF THE DISCLOSURE

An increased amount of leisure time and a desire to travel have caused an increased demand for camping and hotel facilities. Because of the high cost of motels and hotels and the desire to be free of concern about reservations, and to be closer to nature, camping has become increasingly popular. There is presently available a variety of camping equipment which provides sleeping accommodations, including all sorts of tents, towed house trailers, campers mounted on truck chassis, converted large station wagons, and towed tent trailers. Tents are often unstable and difficult to set up while some other sleeping arrangements, such as house trailers, are relatively expensive.

SUMMARY OF DISCLOSURE

In one embodiment of the present invention a foldable sleeping compartment is adapted to be removably secured to the top of an automobile. The compartment includes three rigid and lightweight panels, preferably of plastic resin reinforced with glass fiber fabric. The panels are configured generally in a highly desirable shell form to enhance enclosure formed thereby. The compartment is constructed in a highly desirable manner yet relatively simple manner with the rear and front end panels each pivotally hinged to a floor panel. The front and back panels fold over to a closed position forming a low profile weatherproof readily transportable enclosure, which holds a mattress and other members of the compartment. A flexible cover is secured to the top of the front and rear panels and may be removably fastened to one side of those panels. Conveniently, the cover automatically folds into position when the panels are pivoted to the open or upright position. An extension of the flexible cover forms a canopy over an open side to provide entry to the compartment.

In another embodiment of the present invention, the same general type of compartment, instead of being mounted on the top of a car, is mounted on a trailer adapted to be towed by a car. In this larger trailer embodiment, a side door entrance is pivotally mounted so that it can be conveniently stored in the compartment in the closed position and will automatically move to a vertical position when the end panels are lifted to their upright position.

It is the object of the present invention to provide a sleeping compartment of relatively simple construction which, in one embodiment, is adapted to be removably secured to the top of a car and which, in another embodiment, may be towed behind a car and wherein each of the embodiments of the compartment is (1) relatively low in cost; (2) easily erected and collapsed to its folded position by one person without using special tools wherein parts automatically fold into position; (3) sturdy and wind resistant when erected; (4) not damp, as the floor is raised above the ground; (5) convenient to store when not in use; and (6) lightweight and provides a compact structure having a low wind resistance for convenient transport.

Figure 7:
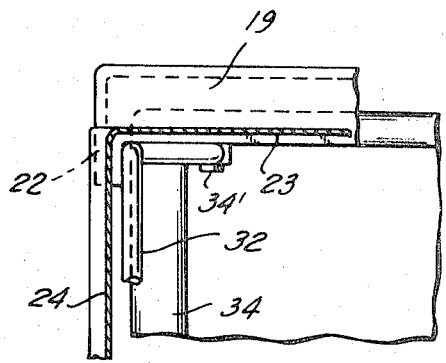
Figure 8:
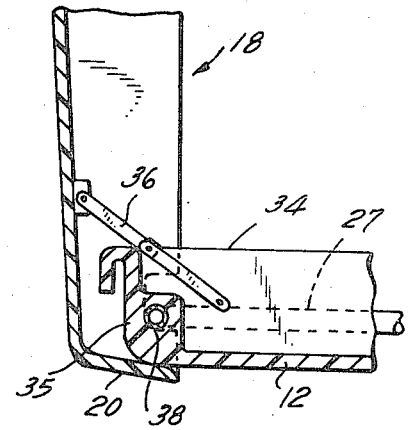
Figure 9:
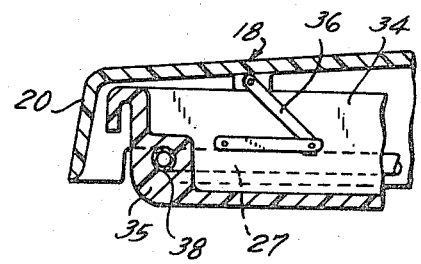
Figure 11:
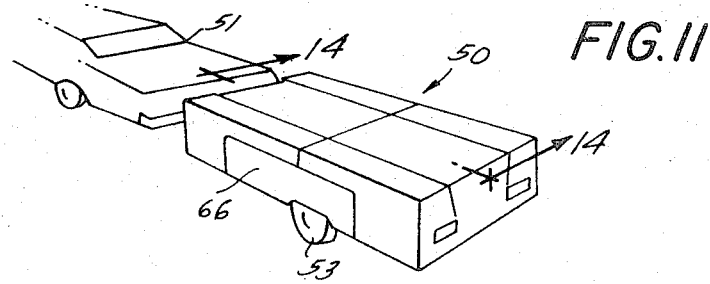
Figure 12:
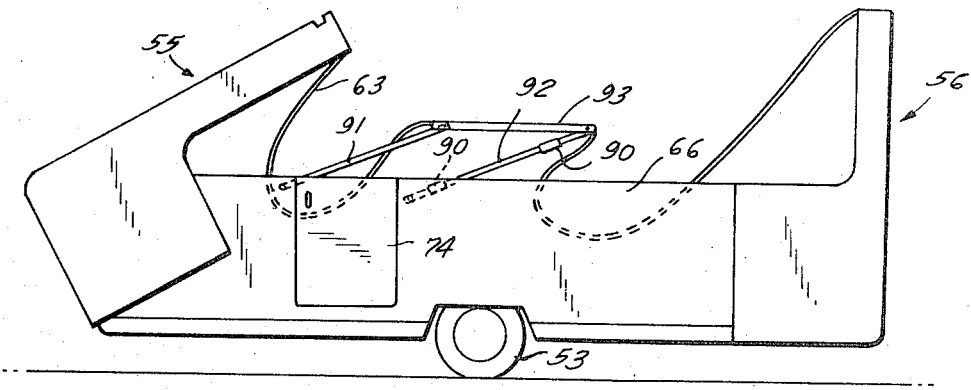
Figure 13:
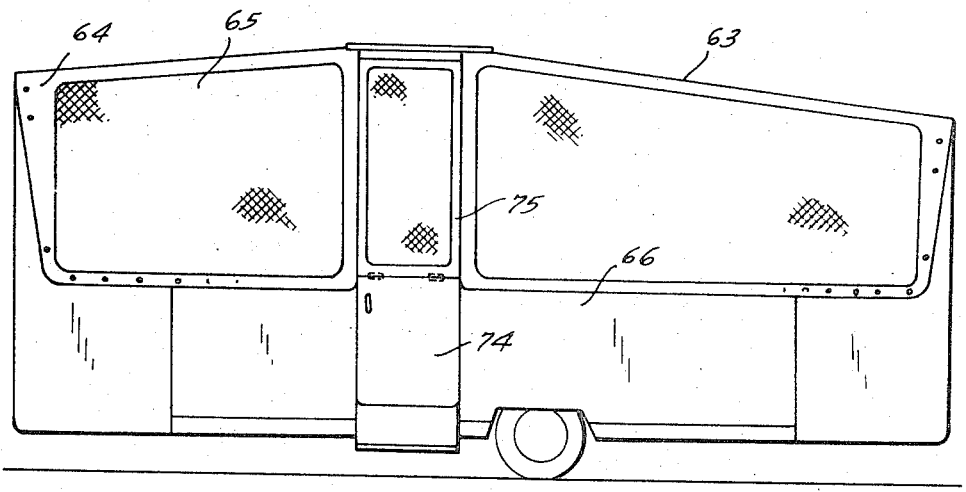

Other objects and advantages will be apparent from the detailed specification, claims, and drawings wherein:

FIG. 1 is a perspective view of the first embodiment of the sleeping compartment of the present invention mounted on top of an automobile, FIG. 2 is a side plan view of the compartment of FIG. 1 with the compartment in the folded position, FIG. 3 is a perspective exploded view of the compartment of FIG. 1, FIG. 4 is an enlarged side plan view of the unfolded compartment of FIG. 1, FIG. 5 is a perspective view of thee unfolded compartment of FIG. 4, FIG. 6 is a side cross sectional view taken along line 6—6 of FIG. 5, FIG. 7 is a top cross sectional the taken along line 7—7 of FIG. 6, FIG. 8 is a side cross sectional view taken along line 8—8 of FIG. 5 and showing the pivoting arrangement of the back panel in its open vertical position, FIG. 9 is a side cross sectional view, similar to FIG. 8, showing the back panel in its closed horizontal position, FIG. 10 is an enlarged perspective view of the hinge structure of the support bar, FIG. 11 is a perspective view of the second embodiment of the present invention illustrating the foldable sleeping compartment mounted on a trailer and pulled by an automobile, FIG. 12 is an enlarged side plan view of the trailer compartment of FIG. 11 in the process of being opened and unfolded with certain parts removed for clarity of illustration, FIG. 13 is a side plan view of the trailer compartment of FIG. 12 in its unfolded and erected position.

FIG. 14 is a side cross sectional view of the trailer compartment of FIG. 12 in its folded position, FIG. 15 is a top cross sectional view taken along lines 15—15 of FIG. 14, FIG. 16 is a side cross sectional view of the trailer compartment of FIG. 12 in its opened position without the flexible cover for clarity of illustration, FIG. 17 is a top view taken along line 17—17 of FIG. 16, FIG. 18 is a side cross sectional view taken along line 18—18 of FIG. 15, and FIG. 19 is a side cross sectional view taken along line 19—19 of FIG. 15.

DETAILED DISCLOSURE

The sleeping compartment of the present invention is described below in connection with two embodiments. The first embodiment, shown in FIGS. 1-10, is of a foldable compartment which is removably secured to the top of an automobile. The second embodiment, shown in FIGS. 11-19, is mounted on a trailer.

As illustrated in FIG. 1, the sleeping compartment 11 of the first embodiment is adapted to be removably attached to the top of an automobile 10. The compartment 11 includes a rectangularly shaped floor panel 12 having an upraised flange 34 extending about its four edges. The floor panel 12 is preferably large enough to accommodate two sleeping bags side-by-side or a double bed mattress. It is of sufficient strength and rigidity so that it will support two persons who may stand or recline on it. For example, the floor panel 12 may be of a mat or cloth of glass fibers which reinforce a polyester plastic resin. The floor panel 12 has attached thereto, or integral therewith, four legs which terminate in rubber suction cups 30 which are adapted to removably secure the panel to the top of an automobile. In addition, four straps 29 are attached to the floor panel 12 and have hooks at their end which fit on the rain gutters of the automobile to aid in securing the compartment to the top of the automobile. Advantageously, when not in use, the compartment 11 can be folded and may be removed from the car and stored in a garage or other convenient storage location.

The sleeping compartment 11 is advantageously provided with a front panel 13 and a back panel 18 which are pivoted on the floor panel 12. The front panel 13 and back panel 18 are of relatively rigid and lightweight construction, for example, of a polyester plastic resin reinforced by glass fibers in the form of a mat or cloth, although other lightweight materials, such as aluminum may alternately be used. The front panel 13 has a top flange 14, a bottom flange 15 and side flanges 16 and 17. Similarly, the back panel 18 has a top flange 19, a bottom flange 20 and side flanges 21 and 22.

A flexible cover 23 is removably attached to the tops of the panels 13 and 18 and is preferably integrally formed with a side flap 24 and with a canopy 26. The panel 18 is of a greater length than panel 13 to provide a pitched overhead for rain drainage. These covers, 23, 24, and 26 are of a weatherproof and flexible material, for example, of a vinyl plastic resin covered canvas or of a rubberized nylon cloth. Normally, the cover 23 is removed from the front and back panels 13 and 18 only when replacing the cover. The side flap 24 can be conveniently snapped onto the side flanges 17 and 22 and has a screen 25 or a flexible plastic window fitted thereon. The side flap 24 can be readily unsnapped from the flanges 17 and 22 and stored within the folded compartment when the compartment is folded down. Similarly, the canopy 26 may be attached in place by means of hooks 26a to a U-shaped extension bar 27 and when unhooked can be stored within the compartment when it is folded down.

As illustrated in FIG. 2, the compartment, when folded down with the front panel 13 and back panel 18 in their horizontal positions, forms a low silhouette unit of relatively low wind resistance and which is weatherproof and may be used as a top car carrier to store a certain amount of baggage. For example, the ladder 31 which aids the passengers in climbing into the erected sleeping compartment 11, is preferably stored with the folded compartment when traveling. As shown in FIG. 3, the U-shaped extension bar 27 slides freely within a bore within the support 27a which is integrally formed with the floor panel 12.

A second U-shaped support bar 32 is pivotally mounted by pivot pins 34' supported by the flange of the floor panel 12. The U-shaped support bar 32 is swung from its horizontal position (when the compartment is folded shut) to its vertical position (when the compartment is opened) by pivoting it about its pivot pins 34', as illustrated in FIGS. 3 and 10.

As shown particularly in FIGS. 6-9, the front panel 13 and back panel 18 are pivotally hinged to the floor panel 12. The pivot means on each of the two panels are the same and include a rod 37, on one side, which is integrally formed with the front and back panels and which fits within a bore 38 in the flange 34 of the floor panel 12.

On the other side of each of the front and back panels a foldable metal strap 36 is pivotally connected to the panels and is hingedly connected to the flange 34.

When the owner wishes to go on a trip, he will fasten the folded compartment, as shown in FIG. 2, to the top of the car using the suction cups 30 and straps 29. For example, the folded compartment may be held by ropes from the roof of the garage so that he need only drive the car under the compartment and lower the compartment onto the car. The ladder 31, the flexible cover 23, and the bars 27 and 32 are all within the folded compartment, along with possibly a mattress or sleeping bags or an inflatable mattress. When the owner arrives at the camping ground, and wishes to erect the sleeping compartment, he will first lift the back panel 18 to its vertical position and lock it in place by fully extending the rigid metal strap 36, as shown in FIG. 8. He will then lift the front panel 13 to its vertical position, as illustrated in FIG. 4, and similarly lock it in place using the rigid metal strap 36. The erection of the front and back panels will automatically, as shown in FIG. 4, cause the top cover 23 to be come taut. He will then fasten the side flap 24 to the respective side flanges using snaps, a zipper or other fastening means. He will also lift the support bar 32 to its vertical position and pull out the extension bar 27. He will then attach the hooks 26a at the end of canopy 26 to the extension bar 27 and hold down the extension bar 27 by using the flexible straps 28 which hook underneath the automobile 10. The ladder will then be fixed on the flange 34. Thus, the compartment is easily and conveniently made ready for use. If desired, the canopy 26, after the occupants are within the sleeping compartment, may be removed from the bar 27 and secured to the flanges 16, 21, and 34 to provide a more weather-tight structure.

SLEEPING COMPARTMENT MOUNTED ON A TRAILER

The embodiment of FIGS. 11-19 is in the form of a trailer 50 which is adapted to be towed behind an automobile 51. The trailer body is mounted in the usual manner on an axle with freely rotatable tires 53. The trailer body, as illustrated in FIG. 14 in its closed position and in FIG. 16 in its open position, consists generally of a floor panel 54, two opposite side walls 66 and 67 secured to the floor panel 54, a front panel 55, and a back panel 56. The front and back panels 55 and 56 are advantageously configured as shells which enhance the formation of the enclosure in both the open and closed position. As with the embodiment, illustrated in FIGS. 1-10, the length of the shell shaped panels are such that when placed in the closed position the interior of floor panel 54 is completely covered in a water-tight enclosure. As illustrated in FIG. 14, the panels 55 and 56 are of a complementary length so that there free ends mate to form a water-tight enclosure when in the closed position. The floor panel 54 consists of a bottom protective panel 57, cross-beams 58, and a top panel 59. For example, the panels 57 and 59 may be of plywood.

The front panel 55 and back panel 56 are of similar configuration and preferably are of polyester plastic resin reinforced with glass fiber fabric. To provide the desired shell shape, each of the panels 55 and 56 has a flat portion 68, 68', a front side flange 69, 69', an opposite side flange 70, 70', and a bottom flange 71, 71'.

The bottom flanges 71, 71' are hinged to the floor panel 54 at pivots 61 and 61'.

A flexible cover 63 which may be in one or two sections is attached to the top of panels 55 and 56. The flexible cover 63 is integrally formed with the side covers 64 which are removably secured, for example, by snaps to the flanges of the end panels and the top of the side walls 66–67. The side covers 64 have flexible screens 65 or flexible windows and the side walls 66–67, as shown in FIGS. 18 and 19, may be integral with the bottom panel 57.

A bottom door member 74 is hinged on the side wall 66, and a top door 75 is hinged on a top door frame 73. In turn the top door frame 73 is hinged, at hinges 90, to an elongated door frame member 92. The door frame member 92 is parallel with a second elongated door frame member 91. The two parallel elongated door frame rods or members 91 and 92 are pivotally connected at their lower ends to side wall 66 and are pivotally connected at their top ends to a roof plate 93. The other end of roof plate 93 is supported by similarly pivoted elongated rod members 94 and 95. The roof plate is secured to, and supports, the flexible cover 63.

Thus, the top door 75 and top door frame 73 may be pivoted about hinges 90 and folded from the upright position of FIG. 16 to the stored position, illustrated in FIG. 15.

Many arrangements of tables, mattresses and toilets are possible within the trailer of the present invention. The specific arrangement of FIGS. 14–19 provides a compact and yet comfortable grouping of tables and beds. In its open and unfolded position, shown in FIGS. 16 and 17, a first mattress 80, and a second mattress 81 are positioned on opposite sides of a table 82. Another mattress 83 is positioned transversely at the opposite end of the trailer and still another mattress 84 can be positioned in its center.

In its folded position the table and mattress provide a compact structure which provides room for storage as illustrated in FIGS. 14, 15, 18, and 19. Thus when folded, the table 82 is placed in a vertical position and the mattresses 80 and 81 and the table legs are placed on the cover support 86. A cover 85 on support 86 provides access to a storage compartment formed by support 86. A similar cover 85' provides access to the similar compartment formed by support 86'. Two additional storage compartments are formed by support 87 having top access doors 88 and 89 permitting entry to the compartment formed by the support 87. The mattresses 83 and 84, and the flat rigid boards supporting those mattresses, are held by shoulders 96 and 97 formed in a vertical portion of support 87.

The owner of the trailer 50 would normally keep it parked in his garage or yard. When he is ready to take it on a trip he hitches the car 51 to the trailer 50. During the trip, the folded panels 55 and 56 provide a water-tight enclosure for storage and, in addition, offers little wind resistance. When he arrives at the camping ground the panels 55 and 56 are readily moved to their vertical position. This automatically and conveniently lifts the door and frame members to their vertical position and the top cover 63 is unfolded into the open position. He then fastens down the two side covers, for example, by using snaps and then pivots the top door portions into position. The mattresses, and their support boards, can then easily and quickly be placed into position, as shown in FIGS. 16 and 17.

It will be understood that the foregoing description with the details of exemplary structure is not to be construed in any way to limit the invention, but that modifications may be made thereto without departing from the scope of the invention as set forth in the following claims.

Having thus described the invention, what is claimed is:

1. A portable and foldable sleeping compartment including a floor panel, a front panel, and a rear panel, means to pivotally connect the bottom portions of said front and rear panels adjacent opposite ends of said floor panel, said panels being configured generally as shells to enhance the formation of the enclosure in the open and closed position, support means to hold said front and rear panels in an upright position, and a flexible water resistant top cover connected to the top portions of said front and rear panels and which automatically folds into position when said front and rear panels are moved to a vertical position, one of said front and rear panels being of greater length than the other whereby said top cover provides a pitched overhead for rain drainage, and wherein said panels configured as shells includes said floor panel consisting of a generally flat floor portion for mounting on transport means and a flange extending from said flat portion, and wherein each of said front and back panels consists of a generally flat portion and a flange extending from said flat portion, and wherein the free ends of said front and back panels mate to form a storage enclosure when in the closed position and wherein a support bar is pivoted on said floor panel and extends between said front and rear panels to support said front and rear panels in their vertical position.

2. A portable and foldable sleeping compartment including a floor panel, a front panel, and a rear panel, means to pivotally connect the bottom portions of said front and rear panels adjacent opposite ends of said floor panel, said panels being configured generally as shells to enhance the formation of the enclosure in the open and closed position, support means to hold said front and rear panels in an upright position, and a flexible water resistant top cover connected to the top portions of said front and rear panels and which automatically folds into position when said front and rear panels are moved, and wherein said panels configured as shells includes said floor panel consisting of a generally flat floor portion for mounting on transport means and a flange extending from said flat portion, and wherein each of said front and back panels consists of a generally flat portion and a flange extending from said flat portion, and wherein free ends of said front and back panels mate to form a storage enclosure when in the closed position, and wherein a support bar is pivoted on said floor panel and supports said front and rear panels in their vertical position, and wherein a canopy is provided integrally formed with said top cover, and wherein an extension bar is slidably connected to said floor panel and is extendable outwardly therefrom, and wherein means are provided to removably connect said canopy to said extension bar.

3. The compartment of claim 2 wherein a flexible water resistant side cover is secured to the side portions of said front and rear panels when said panels are in their vertical position.

4. The compartment of claim 3 wherein means are connected to said floor panel to mount said compartment on the top of an automobile, and wherein said means includes flexible suction cups attached to the underside of said floor panel and straps attached at one of their ends to said floor panel and having hooks attached at their free ends for attachment to the automobile.

* * * * *